(12) United States Patent
Sinha

(10) Patent No.: US 7,715,800 B2
(45) Date of Patent: May 11, 2010

(54) SYSTEMS AND METHODS FOR WIRELESS INTRUSION DETECTION USING SPECTRAL ANALYSIS

(75) Inventor: Amit Sinha, Marlborough, MA (US)

(73) Assignee: AirDefense, Inc., Alpharetta, GA (US)

( * ) Notice: Subject to any disclaimer, the term of this patent is extended or adjusted under 35 U.S.C. 154(b) by 739 days.

(21) Appl. No.: 11/332,065

(22) Filed: Jan. 13, 2006

(65) Prior Publication Data

US 2007/0173199 A1    Jul. 26, 2007

(51) Int. Cl.
H04B 17/00    (2006.01)
(52) U.S. Cl. ............... 455/67.11; 455/63.1; 455/67.13; 455/67.14
(58) Field of Classification Search ............. 455/67.13, 455/67.14, 67.11, 63.1, 62, 115.1, 115.3, 455/525, 452.2, 435.2
See application file for complete search history.

(56) References Cited

U.S. PATENT DOCUMENTS

| | | | |
|---|---|---|---|
| 5,077,753 A | 12/1991 | Grau, Jr. et al. | |
| 5,231,634 A | 7/1993 | Giles et al. | |
| 5,237,614 A | 8/1993 | Weiss | |
| 5,339,316 A | 8/1994 | Diepstraten | |
| 5,393,965 A | 2/1995 | Bravman et al. | |
| 5,487,069 A | 1/1996 | O'Sullivan et al. | |
| 5,577,209 A | 11/1996 | Boyle et al. | |
| 5,646,389 A | 7/1997 | Bravman et al. | |
| 5,666,662 A * | 9/1997 | Shibuya .................. | 455/456.4 |
| 5,737,328 A | 4/1998 | Norman et al. | |
| 5,745,479 A | 4/1998 | Burns et al. | |
| 5,745,483 A | 4/1998 | Nakagawa et al. | |
| 5,768,312 A | 6/1998 | Imamura | |
| 5,781,857 A | 7/1998 | Hwang et al. | |
| 5,787,077 A | 7/1998 | Kuehnel et al. | |
| 5,796,942 A | 8/1998 | Esbensen | |
| 5,809,060 A | 9/1998 | Cafarella et al. | |
| 5,825,817 A | 10/1998 | Tamaka et al. | |
| 5,844,900 A | 12/1998 | Hong et al. | |
| 5,866,888 A | 2/1999 | Bravman et al. | |
| 5,870,666 A | 2/1999 | Tanaka et al. | |
| 5,875,179 A | 2/1999 | Tikalsky | |
| 5,896,499 A | 4/1999 | McKelvey | |

(Continued)

FOREIGN PATENT DOCUMENTS

WO    WO 98/59428    12/1998

(Continued)

OTHER PUBLICATIONS

*IBM unlocks wireless security services*, IT WORLD.COM (Date Alleged: Oct. 9, 2001) http://www.itworld.com/Net/2629/IDGO11009IBMsecurity (Accessed from Google's cache: Apr. 10, 2003.

(Continued)

*Primary Examiner*—Lana N Le
*Assistant Examiner*—Ping Y Hsieh
(74) *Attorney, Agent, or Firm*—Clements Bernard PLLC; Lawrence A. Baratta, Jr.; Christopher L. Bernard

(57) ABSTRACT

Systems and methods for using wireless radios for spectral analysis. Systems and methods include using wireless radios that are included in wireless devices communicating on the wireless network to perform a spectral scan of frequencies on a wireless network.

25 Claims, 8 Drawing Sheets

U.S. PATENT DOCUMENTS

| | | | |
|---|---|---|---|
| 5,903,848 A | 5/1999 | Takahashi |
| 5,913,174 A | 6/1999 | Casarez et al. |
| 5,919,258 A | 7/1999 | Kayashima et al. |
| 5,940,591 A | 8/1999 | Boyle et al. |
| 5,953,652 A | 9/1999 | Amin et al. |
| 5,987,609 A | 11/1999 | Hasebe |
| 6,006,090 A | 12/1999 | Coleman et al. |
| 6,058,482 A | 5/2000 | Liu |
| 6,067,297 A | 5/2000 | Beach |
| 6,070,244 A | 5/2000 | Orchier et al. |
| 6,104,712 A | 8/2000 | Robert et al. |
| 6,119,230 A | 9/2000 | Carter |
| 6,141,778 A | 10/2000 | Kane et al. |
| 6,145,083 A | 11/2000 | Shaffer et al. |
| 6,151,357 A | 11/2000 | Jawahar et al. |
| 6,158,010 A | 12/2000 | Moriconi et al. |
| 6,178,512 B1 | 1/2001 | Fifield |
| 6,185,689 B1 | 2/2001 | Todd, Sr. et al. |
| 6,188,681 B1 | 2/2001 | Vesuna |
| 6,202,157 B1 | 3/2001 | Brownlie et al. |
| 6,272,129 B1 | 8/2001 | Dynarski et al. |
| 6,272,172 B1 | 8/2001 | Deshpande et al. |
| 6,282,546 B1 | 8/2001 | Gleichauf et al. |
| 6,289,214 B1 | 9/2001 | Backstrom |
| 6,292,508 B1 | 9/2001 | Hong et al. |
| 6,301,668 B1 | 10/2001 | Gleichauf et al. |
| 6,301,699 B1 | 10/2001 | Hollander et al. |
| 6,304,973 B1 | 10/2001 | Williams |
| 6,317,829 B1 | 11/2001 | Van Oorschot |
| 6,320,948 B1 | 11/2001 | Heilmann et al. |
| 6,324,647 B1 | 11/2001 | Bowman-Amuah |
| 6,324,656 B1 | 11/2001 | Gleichauf et al. |
| 6,330,244 B1 | 12/2001 | Swartz et al. |
| 6,363,477 B1 | 3/2002 | Fletcher et al. |
| 6,400,752 B1 | 6/2002 | Suzuki et al. |
| 6,404,772 B1 | 6/2002 | Beach et al. |
| 6,411,608 B2 | 6/2002 | Sharony |
| 6,453,159 B1 | 9/2002 | Lewis |
| 6,453,345 B2 | 9/2002 | Trcka et al. |
| 6,466,608 B1 | 10/2002 | Hong et al. |
| 6,470,384 B1 | 10/2002 | O'Brien et al. |
| 6,473,449 B1 | 10/2002 | Cafarella et al. |
| 6,477,198 B1 | 11/2002 | Gumm |
| 6,484,029 B2 | 11/2002 | Hughes et al. |
| 6,487,666 B1 | 11/2002 | Shanklin et al. |
| 6,499,107 B1 | 12/2002 | Gleichauf et al. |
| 6,501,951 B2 | 12/2002 | Moore |
| 6,507,864 B1 | 1/2003 | Klein et al. |
| 6,522,689 B1 | 2/2003 | Heinrich |
| 6,539,207 B1 | 3/2003 | del Castillo et al. |
| 6,539,428 B2 | 3/2003 | Davies |
| 6,674,403 B2 | 1/2004 | Gray et al. |
| 6,697,337 B1 | 2/2004 | Cafarelli et al. |
| 6,799,047 B1 | 9/2004 | Bahl et al. |
| 6,850,736 B2 * | 2/2005 | McCune, Jr. ............. 455/67.13 |
| 6,874,089 B2 | 3/2005 | Dick et al. |
| 6,910,135 B1 | 6/2005 | Grainger |
| 6,934,298 B2 | 8/2005 | Bentley |
| 7,039,330 B2 * | 5/2006 | Lenosky ................. 398/208 |
| 7,110,756 B2 * | 9/2006 | Diener .................. 455/423 |
| 2001/0027107 A1 | 10/2001 | Shinozaki et al. |
| 2001/0030956 A1 | 10/2001 | Chillariga et al. |
| 2001/0038626 A1 | 11/2001 | Dynarski et al. |
| 2001/0039579 A1 | 11/2001 | Trcka et al. |
| 2002/0021745 A1 | 2/2002 | Negus |
| 2002/0029288 A1 | 3/2002 | Dobbins et al. |
| 2002/0032871 A1 | 3/2002 | Malan et al. |
| 2002/0035699 A1 | 3/2002 | Crosbie |
| 2002/0044533 A1 | 4/2002 | Bahl et al. |
| 2002/0059434 A1 | 5/2002 | Karoguz et al. |
| 2002/0060994 A1 | 5/2002 | Kovacs et al. |
| 2002/0060995 A1 | 5/2002 | Cervello et al. |
| 2002/0061031 A1 | 5/2002 | Sugar et al. |
| 2002/0066034 A1 | 5/2002 | Schlossberg et al. |
| 2002/0072329 A1 | 6/2002 | Bandeira et al. |
| 2002/0083343 A1 | 6/2002 | Crosbie et al. |
| 2002/0087882 A1 | 7/2002 | Schneier et al. |
| 2002/0090089 A1 | 7/2002 | Branigan et al. |
| 2002/0090952 A1 | 7/2002 | Cantwell |
| 2002/0094777 A1 | 7/2002 | Cannon et al. |
| 2002/0101837 A1 | 8/2002 | Bender et al. |
| 2002/0112047 A1 | 8/2002 | Kushwaha et al. |
| 2002/0112185 A1 | 8/2002 | Hodges |
| 2002/0129138 A1 | 9/2002 | Carter |
| 2002/0138755 A1 | 9/2002 | Ko |
| 2002/0147920 A1 | 10/2002 | Mauro |
| 2002/0160769 A1 | 10/2002 | Gray |
| 2002/0161755 A1 | 10/2002 | Moriarty |
| 2002/0174364 A1 | 11/2002 | Nordman et al. |
| 2002/0176437 A1 | 11/2002 | Busch et al. |
| 2002/0178383 A1 | 11/2002 | Hrabik et al. |
| 2002/0181417 A1 | 12/2002 | Malhotra et al. |
| 2003/0009696 A1 | 1/2003 | Bunker V, et al. |
| 2003/0021254 A1 | 1/2003 | Fukuda |
| 2003/0026198 A1 | 2/2003 | Diepstraten et al. |
| 2003/0027550 A1 | 2/2003 | Rockwell |
| 2003/0036404 A1 | 2/2003 | Adachi et al. |
| 2003/0048770 A1 | 3/2003 | Proctor, Jr. |
| 2003/0060207 A1 | 3/2003 | Sugaya et al. |
| 2003/0061344 A1 | 3/2003 | Monroe |
| 2003/0061506 A1 | 3/2003 | Cooper et al. |
| 2003/0063592 A1 | 4/2003 | Seki et al. |
| 2003/0064720 A1 | 4/2003 | Valins et al. |
| 2003/0065934 A1 | 4/2003 | Angelo et al. |
| 2003/0070084 A1 | 4/2003 | Satomaa et al. |
| 2003/0084323 A1 | 5/2003 | Gales |
| 2003/0088789 A1 | 5/2003 | Fenton et al. |
| 2003/0095520 A1 | 5/2003 | Aalbers et al. |
| 2003/0096577 A1 | 5/2003 | Heinonen et al. |
| 2003/0096607 A1 | 5/2003 | Taylor |
| 2003/0100308 A1 | 5/2003 | Rusch |
| 2003/0105976 A1 | 6/2003 | Copeland, III |
| 2003/0108016 A1 | 6/2003 | Bonta |
| 2003/0110398 A1 | 6/2003 | Dacier et al. |
| 2003/0117966 A1 | 6/2003 | Chen |
| 2003/0117985 A1 * | 6/2003 | Fujii et al. ................. 370/338 |
| 2003/0117986 A1 | 6/2003 | Thermond et al. |
| 2003/0119526 A1 | 6/2003 | Edge |
| 2003/0120821 A1 | 6/2003 | Thermond et al. |
| 2003/0123420 A1 | 7/2003 | Sherlock |
| 2003/0125035 A1 | 7/2003 | Khafizov et al. |
| 2003/0126258 A1 | 7/2003 | Conkright et al. |
| 2003/0135762 A1 | 7/2003 | Macaulay |
| 2003/0140246 A1 | 7/2003 | Kammer et al. |
| 2003/0149888 A1 | 8/2003 | Yadav |
| 2003/0161341 A1 | 8/2003 | Wu et al. |
| 2003/0174680 A1 | 9/2003 | Kuan et al. |
| 2003/0185244 A1 | 10/2003 | Wu et al. |
| 2003/0189908 A1 | 10/2003 | Kuan et al. |
| 2003/0192055 A1 | 10/2003 | Aoki et al. |
| 2003/0196115 A1 | 10/2003 | Karp |
| 2003/0200455 A1 | 10/2003 | Wu |
| 2003/0217289 A1 | 11/2003 | Ammon et al. |
| 2003/0221006 A1 | 11/2003 | Kuan et al. |
| 2003/0224797 A1 | 12/2003 | Kuan et al. |
| 2004/0003285 A1 | 1/2004 | Whelan et al. |
| 2004/0068668 A1 | 4/2004 | Lor et al. |
| 2004/0078598 A1 | 4/2004 | Barber et al. |
| 2004/0102192 A1 * | 5/2004 | Serceki ................. 455/434 |
| 2004/0103307 A1 | 5/2004 | Raphaeli et al. |
| 2004/0107219 A1 * | 6/2004 | Rosenberger ............ 707/104.1 |
| 2004/0136318 A1 | 7/2004 | Bentley |

| | | | |
|---|---|---|---|
| 2004/0162995 A1 | | 8/2004 | Muaddi et al. |

FOREIGN PATENT DOCUMENTS

| | | |
|---|---|---|
| WO | WO 01/43467 A1 | 6/2001 |
| WO | WO 02/058346 A2 | 7/2002 |
| WO | WO 02/058346 A3 | 7/2002 |
| WO | WO 02/097560 A2 | 12/2002 |
| WO | WO 03/021851 | 3/2003 |
| WO | WO 03/079708 A1 | 9/2003 |
| WO | WO 03/084255 A1 | 10/2003 |
| WO | WO 03/085544 A1 | 10/2003 |
| WO | WO 03/088547 A2 | 10/2003 |
| WO | WO 03/088687 | 10/2003 |

OTHER PUBLICATIONS

*IBM Research's Wireless Security Auditor One-Step Ahead of Hackers*, MOBILEINFO.COM, Issue 2001—30 (Date Alleged: Jul. 2001) (Alleged Update: Jul. 25, 2001) http://www.mobileinfo.com/News_2001/Issue30/IBM_Auditor.htm (Accessed from Google's cache: Apr. 10, 2003).

*IBM Debuts First Self-Diagnostic Wireless Security Tool on Linux*, LWN.NET, (Date Alleged: Jun. 17, 2002) http://www.lwn.net/Articles/2661 (Accessed: Apr. 10, 2003).

Losi, Stephanie, *IBM Steps Up Wireless Security*, Newsfactor Network (Date Alleged: Oct. 8, 2001) http://www.newsfactor.com/perl/story/14012.html (Accessed: Apr. 10, 2003).

*IBM extends its Wireless Security Auditor with more autonomic features*, Serverworld: Online News (Date Alleged: Jun. 2002) http://www.serverworldmagazine.com/newsflash2/2002/06/19_ibmdwsa.shtml (Accessed: Apr. 10, 2003).

Schwartz, Ephraim, *IBM Offers a Peek at Self-Healing PCS: Autonomic computing initiative will lead to self-configuring desktops and notebooks and greater wireless security.* (Date Alleged: Nov. 19, 2002) http://www.pcworld.com/resource/printable/article/0,aid,107069.asp (Accessed from Google's cache: Apr. 10, 2003).

*IBM initiative addressed wireless security*, M2 Preswire (Date alleged: Oct. 9, 2001) http://www.lexis.com/research (Accessed: Apr. 10, 2003).

Manecksha, Ferina, *IBM to focus on "Think" strategy*, News Straits Times-Management Times (Date Alleged: Jan. 30, 2003) http://www.lexis.com/research (Accessed: Apr. 10, 2003).

Schwartz, Ephraim, *IBM unveils autonomic computing on notebooks, desktops*, Inforworld Daily News (Dated Alleged: Nov. 19, 2002) http://www.lexis.com/research (Accessed: Apr. 10, 2003).

Toomgum, Sirvish, *"Think" Big Blue, Nation*, Worldsources, Inc. (Date Alleged: Nov. 19, 2002) http://www.lexis.com/research (Accessed: Apr. 10, 2003).

Morochove, Richard, *Why Dell lets competitors do the heavy lifting*, Toronto Star (Date Alleged: Nov. 11, 2002) http://www.lexis.com/research (Accessed: Apr. 10, 2003).

*Wireless Security Auditor (WSA)*, IBM Security Research http://www.research.ibm.com/gsal/wsa/ (Accessed: Apr. 10, 2003).

*Distributed Wireless Security Auditor*, IBM Research http://www.research.ibm.com/gsal/dwsa/ (Accessed: Apr. 10, 2003).

*WhereLAN Location Sensor Locating Access Point*, Wherenet U.S.A. (2002).

Article entitled "A Short Tutorial on Wireless LANs and IEEE 802.11" by Lough et al., printed on May 27, 2002 in *The IEEE Computer Society's Student Newsletter*, Summer 1997, vol. 5, No. 2.

\* cited by examiner

SYSTEMS AND METHODS FOR WIRELESS INTRUSION DETECTION USING SPECTRAL ANALYSIS

BACKGROUND AND SUMMARY

This disclosure relates to wireless network security systems and methods, and more particularly to systems and methods for using spectrum and power measurement analysis for intrusion detection in wireless networks. The proposed methods may be used for identifying and locating sources of interference as well as improving channel monitoring to detect intrusions and unauthorized wireless activity.

Wireless Local Area Networks (WLANs) offer a quick and effective extension of a wired network or standard local area network (LAN). WLAN devices comprise a combination of wireless access points (APs), WLAN cards, and other devices. WLAN devices comprise a wireless radio configured to tune to a specified wireless channel to transmit and receive packets. The channels correspond to a center frequency and bandwidth of the wireless spectrum.

WLANs have proliferated due to the standardization of the Institute of Electrical and Electronics Engineers (IEEE) 802.11 family of protocols and the availability of license free radio frequency (RF) spectrum for communication across the globe. WLANs typically use the 2.4 GHz and 5 GHz bands for communications in the United States. In the United States, the Federal Communications Commission (FCC) has designated these bands along with the 900 MHz band for license-free Industrial, Scientific and Medical (ISM). While WLANs offer flexibility and ease of use, the unlicensed spectrum that they use often result in degraded performance due to interference from other ISM band devices such as, for example, cordless phones, microwave ovens, baby monitors, and Bluetooth devices.

Existing Wireless Intrusion Prevention Systems (WIPS) are configured to detect and terminate unauthorized devices from a WLAN. However, unauthorized devices may attempt to channel hop whereby they move from one channel to another to avoid detection and termination. Thus, a persistent unauthorized device may hop to different channels to escape detection from the WIPS. Since WLANs may have multiple channels, WIPS can encounter difficulty in determining to which channel the unauthorized device has moved. Spectrum analysis may provide a means to narrow down which channels are in use, allowing a WIPS to monitor these channels for the unauthorized device.

Existing systems and methods exist for frequency analysis. However, such systems and methods involve additional equipment such as a spectrum analyzer. Spectrum analyzers can cost thousands of dollars and are not widely deployed in WLANs. Other systems and methods include expensive hardware solutions that use Digital Signal Processing (DSP) of time domain samples are used to perform spectral analysis. Similarly, these systems and methods involve additional hardware that is not widely deployed in WLANs.

This disclosure illustrates systems and methods for using existing wireless devices to serve as a spectrum analyzer. In addition to providing network communication, wireless radios in WLANs can be used to provide signal and noise power measurements. These measurements can be stored and analyzed by existing computers in the WLAN to provide a spectrum analysis with no additional hardware components in the WLAN.

A method for using wireless radios for spectral analysis by connecting to the wireless radios, setting a center frequency and bandwidth on the wireless radios, receiving power measurements from the plurality of wireless radios; and repeating the connecting, setting and receiving steps for a number of frequencies of the wireless network.

A method for identifying interference in a wireless network based on spectral analysis by scanning channels of the wireless network for power measurements, receiving power measurements from the plurality of wireless radios, repeating the scanning and receiving steps until a predetermined time has elapsed or substantially all channels have been measured, and constructing a spectrogram based on the power measurements for the channels.

A method for using spectral analysis to determine which channels to monitor for detecting attacks and unauthorized activity on a wireless network by scanning substantially all channels of the wireless network for power measurements, identifying which channels are in use responsive to power measurements, wherein the channels in use comprise channels with high signal power measurements, and updating channel monitoring patterns responsive to which channels are in use.

DETAILED DESCRIPTION

Figure 1:
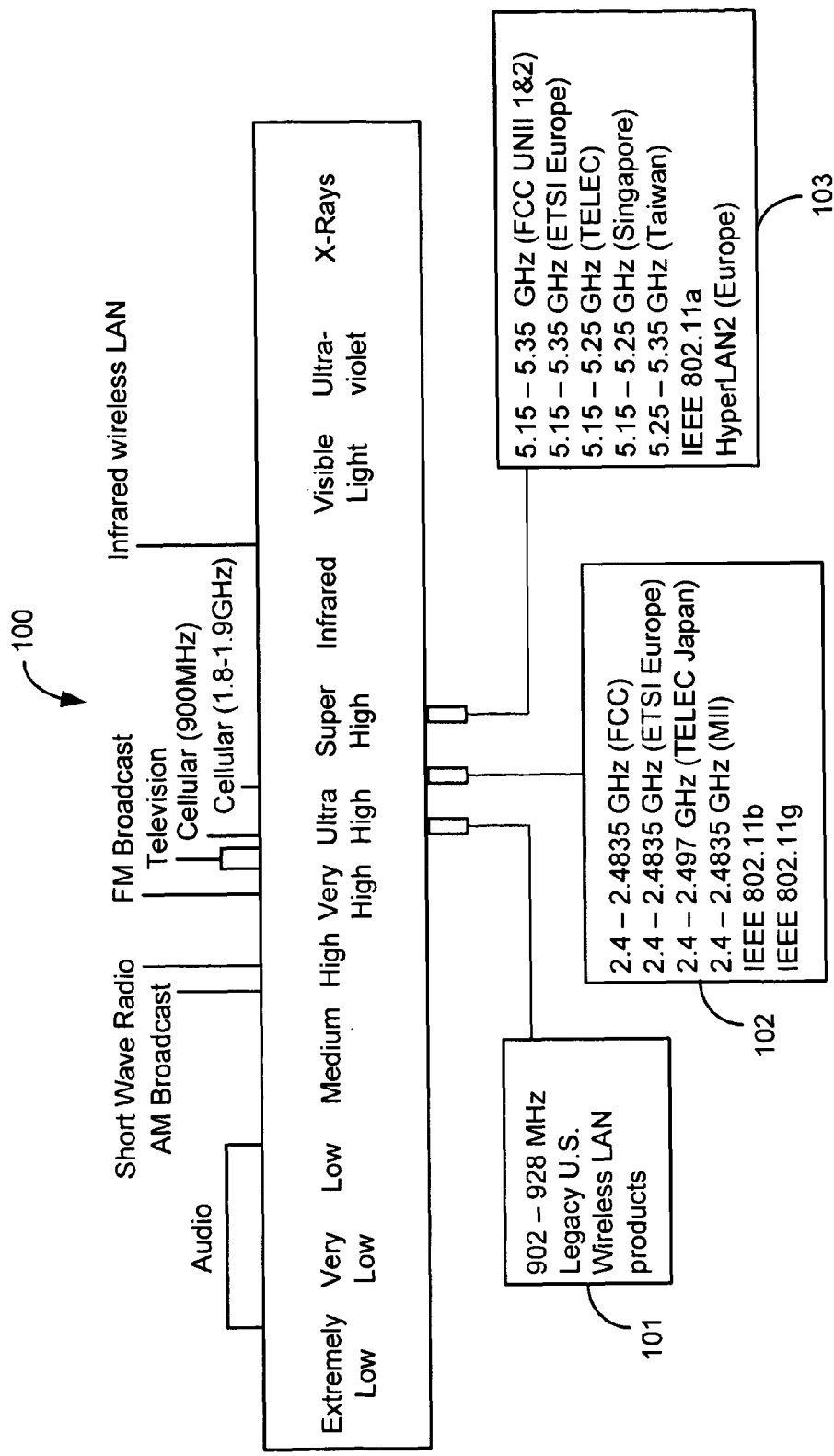
FIG. 1 illustrates a radio frequency (RF) spectrum for communications in various parts of the world.

FIG. 1 illustrates the radio frequency (RF) spectrum 100 for communications across the globe. In the United States, the Federal Communications Commission (FCC) has designated the 900 MHz band 101, the 2.4 GHz band 102, and the 5 GHz 103 band for license-free industrial, scientific, and medical (ISM) applications. Wireless local area networks (WLANs) typically use the 2.4 GHz 102 and 5 GHz 103 bands for communications. Because the bands 101, 102, 103 are license-free, ISM devices operating in these bands can have degraded performance because of interference from other ISM devices. For example, ISM devices can include WLAN access points, WLAN cards, microwave ovens, cordless phones, baby monitors, wireless peripheral devices, and Bluetooth devices, among many others. If such ISM devices are present in the vicinity of a WLAN, they can interfere and degrade performance of the WLAN.

Figure 2A:
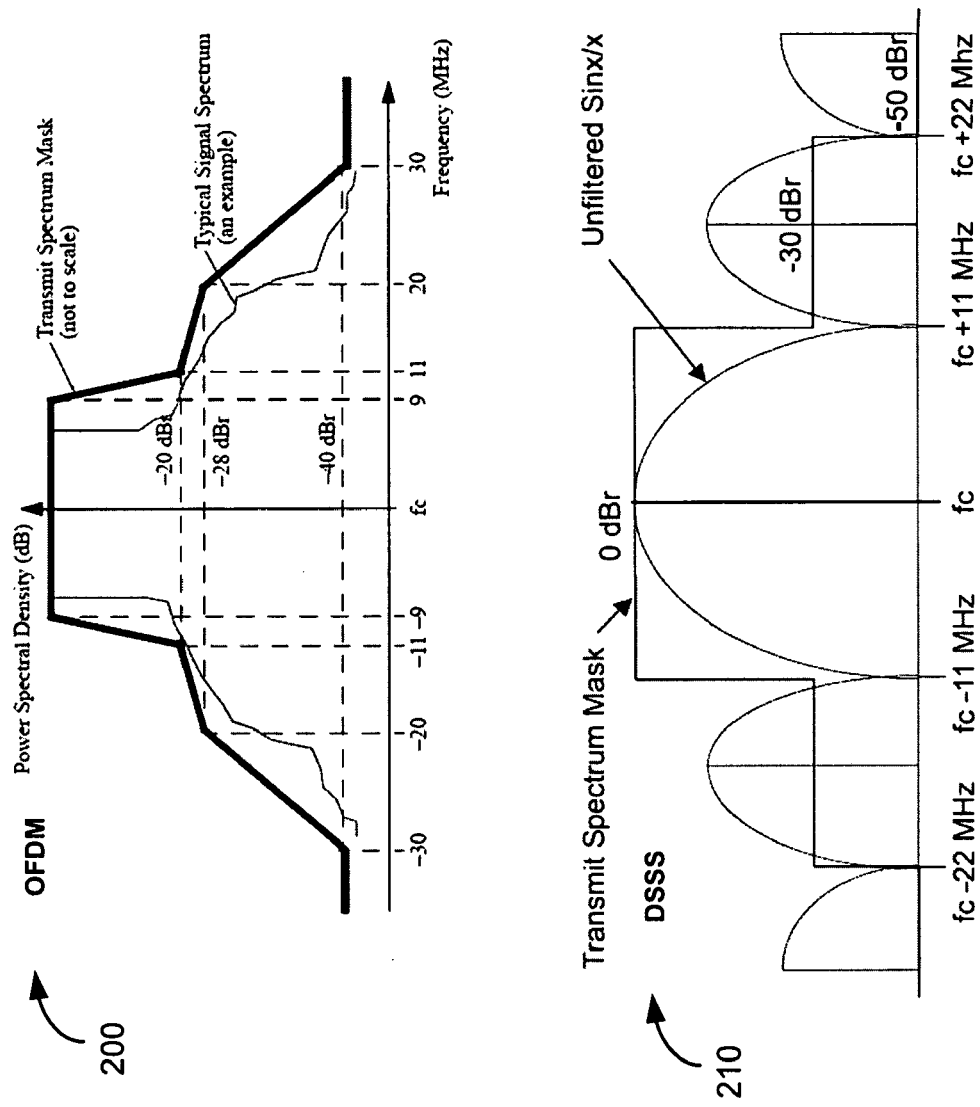
FIG. 2A depicts a transmit spectral mask and a signal spectrum for an orthogonal frequency division multiplexing (OFDM) signal and a direct sequence spread spectrum (DSSS) signal.

FIG. 2A depicts a transmit spectral mask and a typical signal spectrum for an orthogonal frequency division multiplexing (OFDM) signal 200 and a direct sequence spread spectrum (DSSS) signal 210. OFDM 200 and DSSS 210 are two widely deployed modulation schemes for WLANs which typically transmit and/or receive on frequencies between 2.2-2.5 GHz and 4.9-5.9 GHz. OFDM 200 is typically deployed with WLAN systems such as IEEE 802.11g and 802.11a. DSSS 210 is typically deployed with WLAN systems such as IEEE 802.11b. The transmit spectral mask outlines the boundaries of the frequencies and power densities of the transmitted signals. It should be understood that different countries and their respective regulatory domains standardize different frequency ranges and power densities.

A frequency domain spectral analysis of a standards compliant WLAN signal will show that the emission power levels are within the spectral mask shape as shown in FIG. 2A. Just as WLAN modulation schemes have a defined spectral mask; other wireless transmissions also have unique spectral signatures. Rigorous frequency analysis usually requires a spectrum analyzer. Spectrum analyzers can cost thousands of dollars. Alternatively, expensive hardware solutions that use digital signal processing (DSP) of time domain samples are used to perform spectral analysis.

Figure 2B:
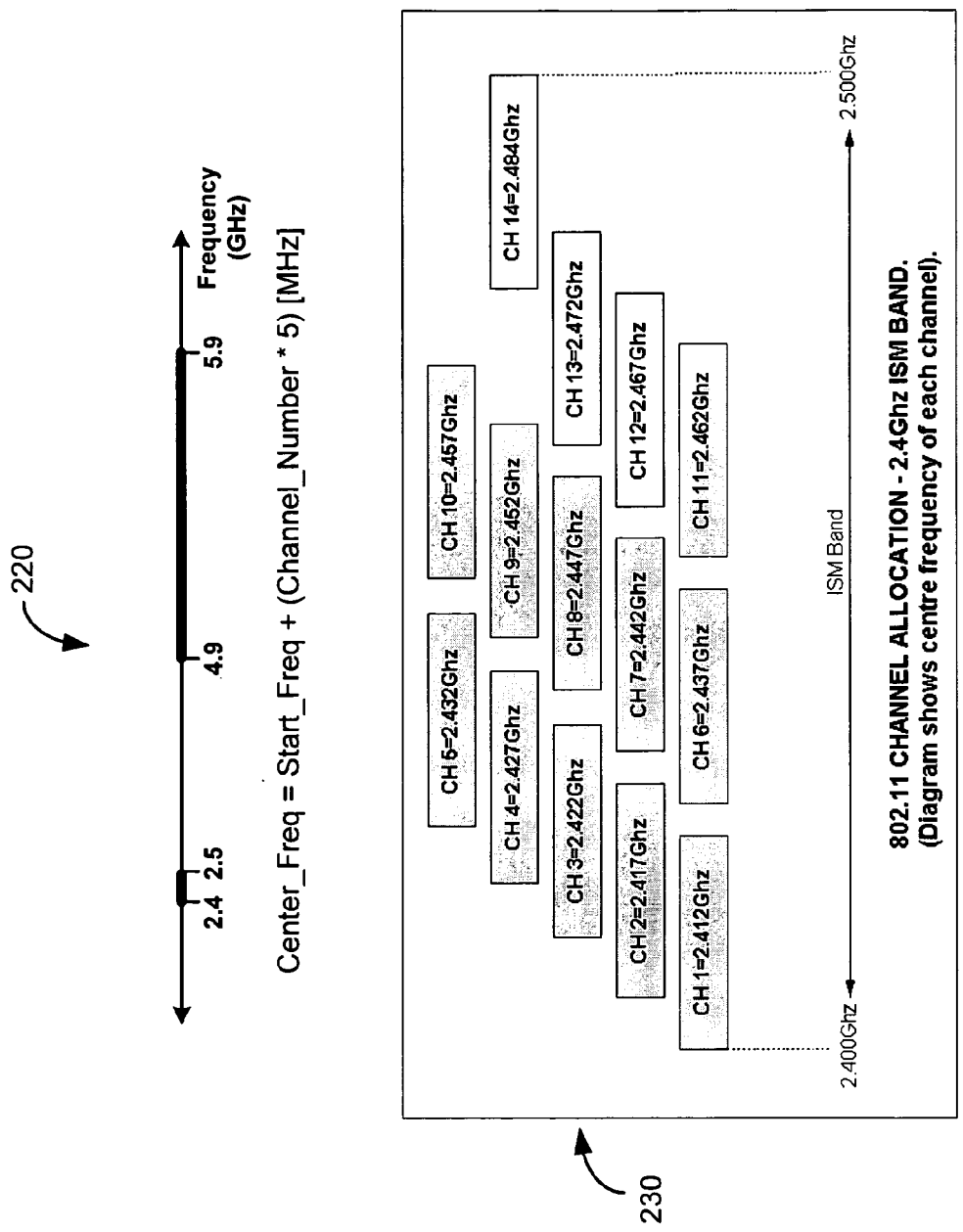
FIG. 2B depicts a graph of the 2.4 GHz and 5 GHz ISM band and a graph of the IEEE 802.11 channel allocation in the 2.4 GHz ISM band.

FIG. 2B depicts a graph 220 of the 2.4 GHz and 5 GHz ISM band and a graph 230 of the IEEE 802.11 channel allocation in the 2.4 GHz ISM band. In accordance with the graph 220, the center frequency of a signal equals the start frequency plus the channel number multiplied by 5 MHz. As stated above, graph 230 depicts the channel allocation in the 2.4 GHz ISM band. It should be understood that both IEEE 802.11b and 802.11g typically use the 2.4 GHz band, while IEEE 802.11a uses the 5 GHz band. There are fourteen channels in the 2.4 GHz band and the center frequency of each channel is shown in graph 230.

Figure 3A:
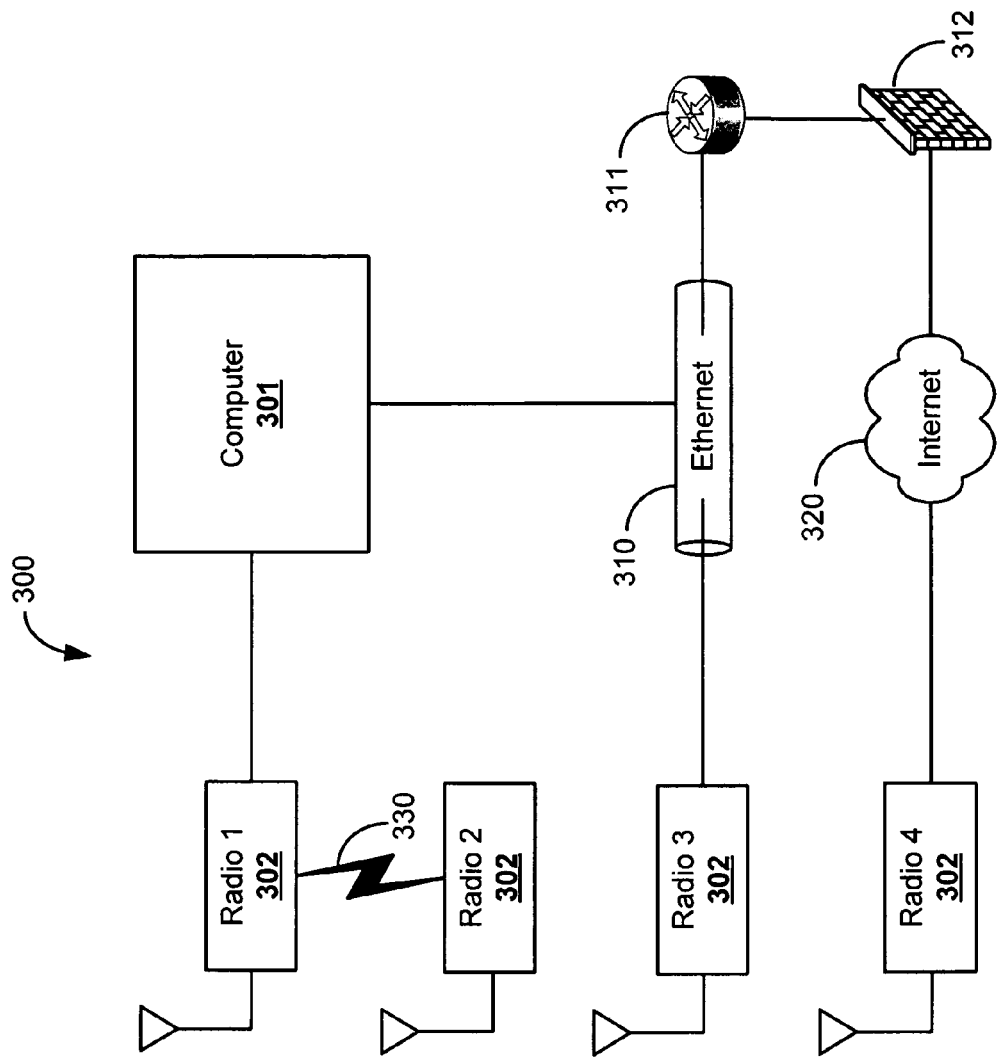
FIG. 3A depicts a block diagram illustrating a system for wireless radio spectrum analysis.

FIG. 3A depicts a system including a wireless radio spectrum analyzer 300. The wireless radio spectrum analyzer 300 is configured to perform spectral analysis using radios 302 and a computer 301. The wireless radio spectrum analyzer 300 is thereby configured to perform spectral analysis using components already found in a WLAN system. Thus, the wireless radio spectrum analyzer 300 reduces the demand for additional components such as a stand-alone spectrum analyzer. The wireless radio spectrum analyzer 300 includes radios 302 which may include, for example, a WLAN card, WLAN access point, among others. The radios 302 are in communication with a computer 301. The computer may comprise, for example, a server, a laptop, a desktop computer, or an appliance, among others. The radios 302 may be directly connected to the computer 302, for example, via a PCMCIA or Cardbus adapter, a PCI or mini-PCI card, or a USB connection, among others. Additionally, the computer 301 may communicate with other radios 302, for example, by using an Ethernet 310 connection, the Internet 320 via a router 311 with a firewall 312, or through a wireless connection 330. While the wireless connection 330 is shown connecting a radio via another radio, it should be understood that combinations of these configurations could be used to communicate information between the radios 302 and the computer 301. For example, the wireless connection could alternatively connect the radio to any of the other radios, or directly to the computer 301.

The computer 301 is configured to set the bandwidth and center frequency of the radios 302 and to receive signal power measurements from the radios. The computer 301 may connect to multiple radios 302 over a specified deployment area to give the analyzer 300 wider spatial coverage. The computer 301 may be configured to store signal power measurements received from the multiple radios 302. The computer 301 may correlate the signal power measurements from the multiple radios 302 to identify interference, to correlate WLAN performance degradations to interference, and to triangulate interference sources.

Figure 3B:
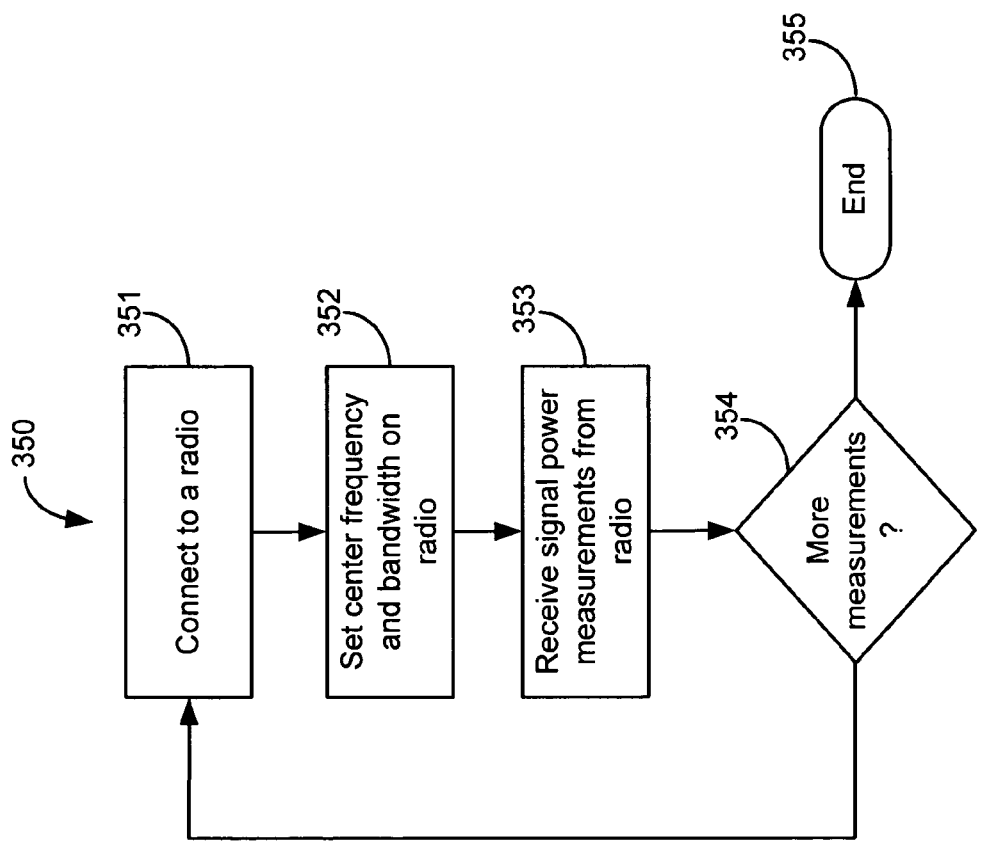
FIG. 3B is a flowchart illustrating an operational scenario for gathering spectral power measurement in accordance with wireless radio spectrum analysis.

FIG. 3B is a flowchart illustrating an operational scenario 350 for using a wireless radio to gather spectral power measurements. The operational scenario 350 begins with a computer connecting to a radio, as depicted in step 351. As shown in FIG. 3A, the computer may connect to the radio through a direct, wireless, Ethernet, or Internet connection. The computer communicates with the radio(s) to set the center frequency (or operating frequency) and the bandwidth on the radio(s), as depicted in step 352. The bandwidth determines the frequency span of the signal that is processed by the radio. A WLAN card can have a 20 MHz bandwidth. However, it should be recognized that some WLAN cards allow a broader range of bandwidths (e.g., ranging from 1 to 40 MHz) and Bluetooth cards, for example, have a 1 MHz bandwidth. The computer receives the signal power measurement from the radio, as depicted in step 353. In addition to receiving and transmitting packets, the WLAN card may report the signal strength measurement at the set center frequency and bandwidth. However, it should be understood that the computer can set the center frequency and use the full available bandwidth of the wireless device radio. If the radio is not decoding packets, the signal power measurements can be reported as channel noise. If more power measurements are to be performed as depicted in step 354, then the computer goes back to step 351 to connect to another radio, otherwise the method ends as depicted in step 355. The computer may repeat the operational scenario 350 on multiple radios over multiple bandwidths and center frequencies to gather spectral power measurements over space and time.

The wireless radio spectrum analyzer 300 may be used with a Wireless Intrusion Prevention System (WIPS). The WIPS can scan the wireless network to detect rogue devices and attacks on the network. The WIPS may operate on combinations of computers, servers, appliances, and wireless radios. Moreover, the WIPS may be used to set the frequency (i.e., operating channel) of the wireless radios. The WIPS system includes algorithms to determine which frequencies to monitor and how much time to spend at each frequency. On any specified channel, the wireless radios can detect packets, analyze the packets, collect relevant statistics, and provide reports and alerts. The WIPS is configured to analyze packets received from all radios to determine if a wireless attack is happening. Additionally, the WIPS detects rogue and unauthorized devices that are communicating with, or are associated with the network. The WIPS reports alarms for these and other events. The WIPS also monitors the performance of a WLAN through error rates and noise levels. Since noise levels are also stored as the normal frequency scanning for WIPS is performed, the system is able to time correlate degraded performance with high noise levels in a given spatial location.

Figure 4:
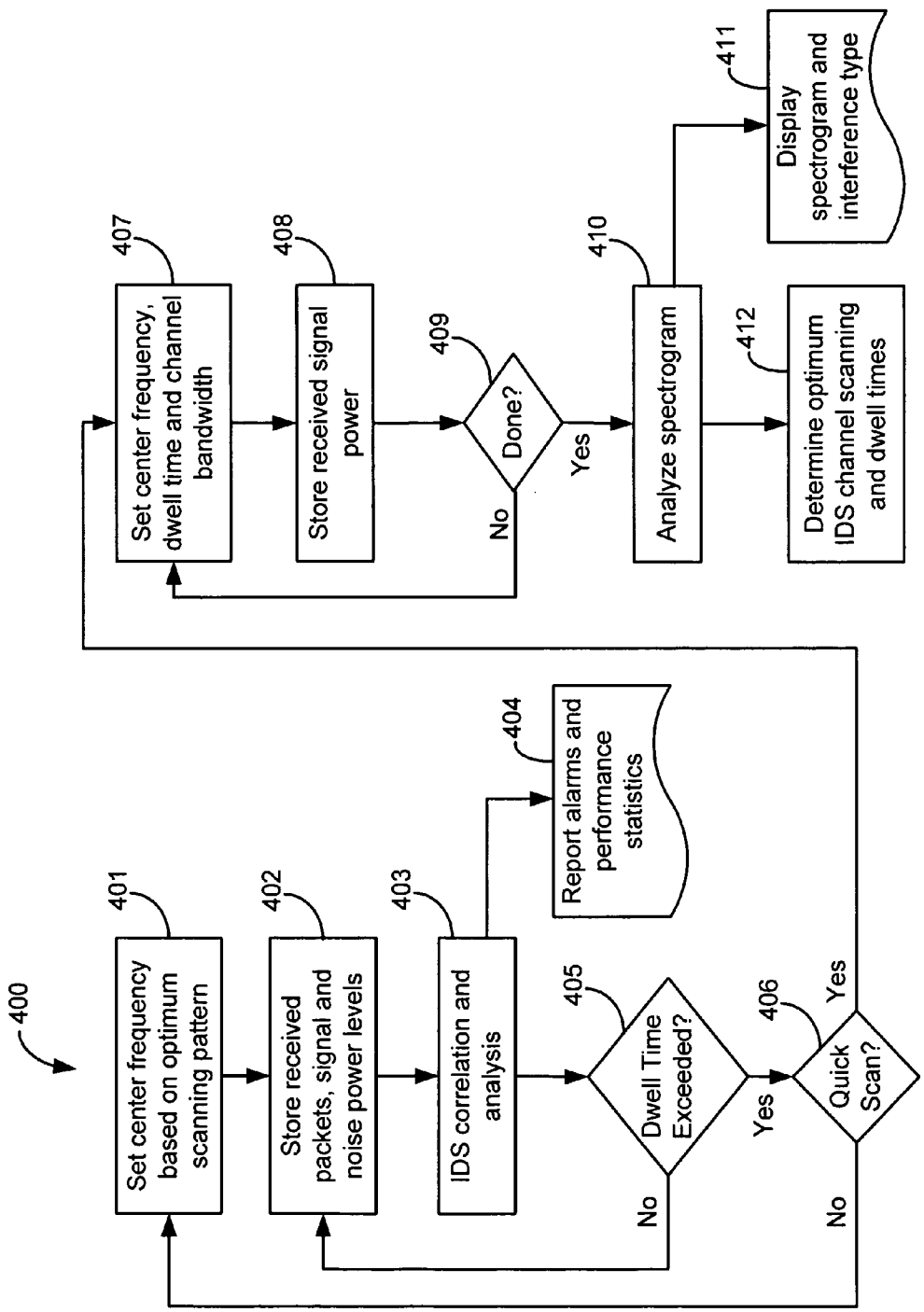
FIG. 4 is a flowchart illustrating an operational scenario for wireless radio spectrum analysis used in the context of a wireless intrusion prevention system (WIPS).

FIG. 4 is a flowchart illustrating an operational scenario 400 of a wireless radio spectrum analyzer used in the context of a WIPS. The WIPS can include a combination of computers and servers coupled to wireless radios (e.g., wireless access points, wireless cards, Bluetooth cards, etc.). The WIPS sets the center frequency on the wireless radios based on a scanning pattern, as depicted in step 401. The WIPS operates across all frequencies (e.g., wireless operating channels) and determines which frequencies to monitor based on past history and current usage. The WIPS stores received packets, signals, and noise power levels from the wireless radios, as depicted in step 402. The WIPS performs intrusion detection system (IDS) correlation and analysis, as depicted in step 403. The IDS includes determining events based on received packets. These events can include, for example, a wireless attack or detection of an unauthorized device. The WIPS reports alarms and performance statistics, as depicted in step 404.

The WIPS can remain at the set center frequency until the dwell time is determined to be exceeded, as depicted in step 405. The dwell time is the amount of time the WIPS is monitoring the particular center frequency. Dwell time is set by the WIPS and may be adjusted based on the scanning pattern. If the dwell time is not determined to be exceeded in step 405, then the WIPS goes to step 402 to store additional received packets, and signal and noise power levels.

If the dwell time is exceeded in step 405, then the WIPS may determine whether to enter a quick scan mode as depicted in step 406. If the WIPS does not enter a quick scan mode in step 406, then it returns to step 401 to set the center frequency based on a scanning pattern. However, when the WIPS enters a quick scan mode, the WIPS sets the center frequency, dwell time, and channel bandwidth on the wireless radios, as depicted in step 407. In the quick scan mode, the WIPS system does not decode packets received from the wireless radio(s). Instead, the WIPS uses the radio(s) included on wireless devices to operate as a spectrum analyzer. The WIPS stores the received signal power measurement from the wireless radios, as depicted in step 408. In the quick scan mode, the WIPS can continue to receive power measurements and set new center frequencies and bandwidths until either a predetermined time has elapsed or all frequencies have been scanned, or some other interrupting event occurs, as depicted in step 409. If the quick scan is not ended, then the WIPS returns to step 407 to set a new center frequency, dwell time, and bandwidth.

In the quick scan mode, the WIPS sweeps across frequencies, dwelling on a given frequency for a specified duration. At each frequency, the wireless radios measure signal power at the specified range of frequencies and transmit measurement to the WIPS. A typical quick scan setting could be frequency range 2.4-2.5 GHz and 4.9-5.9 GHz, with a frequency step of 5 MHz, bandwidth of 20 MHz and dwell time of 10 ms per channel. For higher resolution, a bandwidth of 5 MHz or lower could be used if supported by the wireless radios. The signal power measurements for each frequency bins are recorded. Quick scan mode can be triggered for a specified number of frequency sweeps or interactively started and stopped based on a user's request. For approximately 1 GHz of WLAN spectrum there can be 200 different operating channels when channel steps are spaced 5 MHz apart.

When the WIPS is done with the quick scan as determined in step 409, then the WIPS can analyze the spectrogram generated from the signal power measurements as depicted in step 410. It should be understood that the WIPS system can generate a spectrogram based on the signal power measurements from each center frequency and bandwidth. A WIPS generated spectrogram and interference type can be displayed to a user, as depicted in step 411. The WIPS may be configured, for example, to display the spectrogram from a quick scan or from normal operation on a specified channel. Additionally, the WIPS system may be programmed to contain spectral templates which include expected power measurements for a specific type of signal (e.g. OFDM, DSSS, etc.). The WIPS may be configured to perform coarse analysis to compare the interference type with various spectral templates to provide a user with a suggestion as to the type of interference being observed.

The WIPS can also use the quick scan to determine an IDS channel scanning and dwell times for the various channels, as depicted in step 412. Quick scan further enables the system to determine which frequencies have wireless activity based on raw signal level without having to decode the packet. The quick scan can further assists the WIPS in determining which channels to monitor. A dual-band wireless radio can monitor wireless networks on two channels. A periodic quick scan may be used to optimize the channels on which to concentrate. Additionally, the WIPS periodically terminates unauthorized WLAN devices. These unauthorized devices may try and associated with the WLAN on a different channel (i.e., at a different frequency) by channel hopping. The WIPS may use the quick scan to narrow down the channels to search for a persistent unauthorized device. With the results from the quick scan, the WIPS can determine optimum scanning patterns for the wireless channels to enable the WIPS to follow the unauthorized device from channel to channel.

Figure 5:
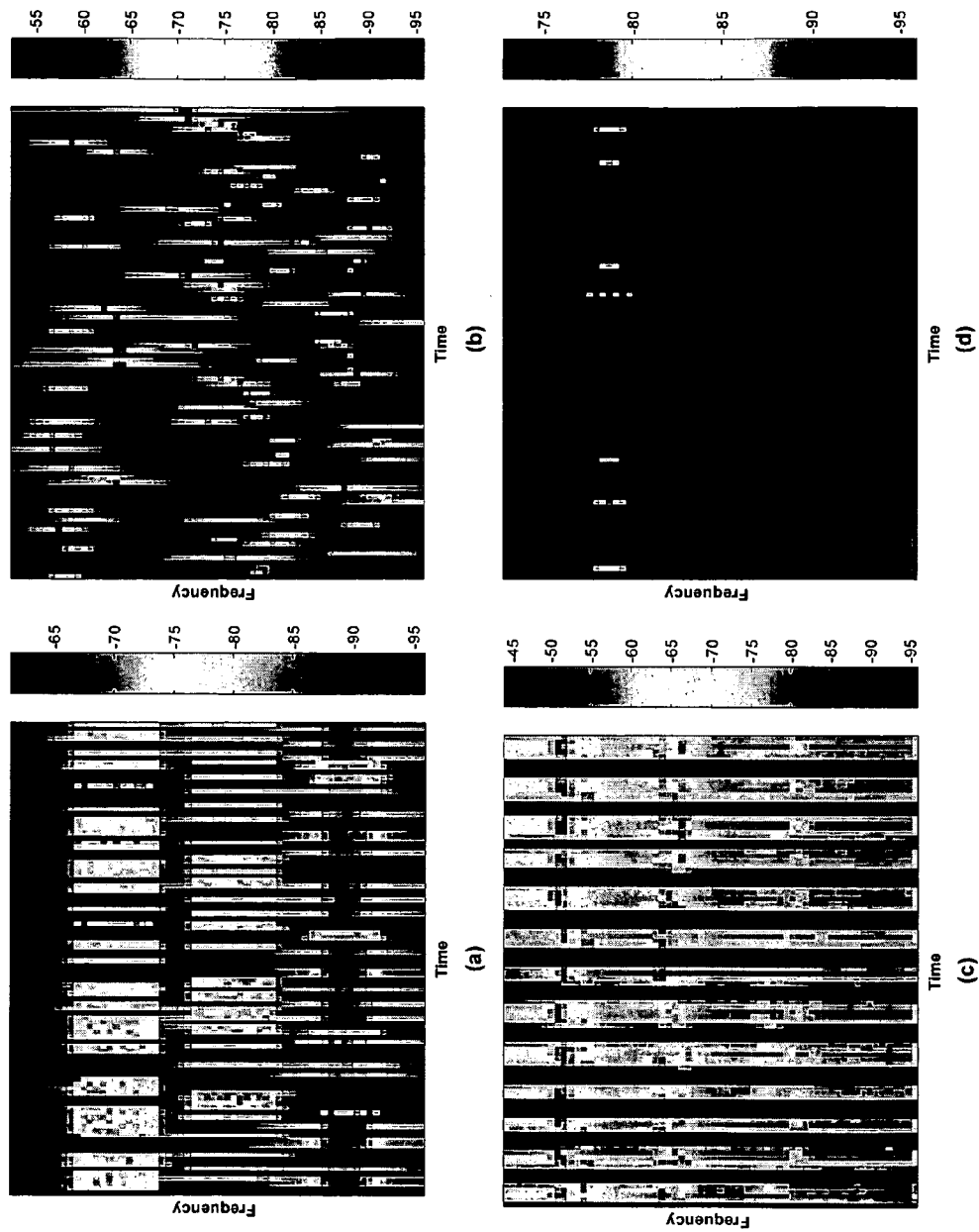
FIGS. 5A-5D are example spectrograms from quick scans in accordance with wireless radio spectrum analysis.

FIGS. 5A-5D depict example spectrograms from quick scans. The spectrogram is a time versus frequency power measurement plot. The spectrograms in FIGS. 5A-5D were generated using quick scans from 2.4 to 2.5 GHz with 1 MHz bandwidth, 5 MHz frequency step size and 10 ms dwell time per frequency. The power measured at each time/frequency point is depicted by the colormap in FIGS. 5A-5D. Power is measured in dBm (decibels referred to milliwatts). FIG. 5A depicts a spectrogram with fully utilized WLAN operation on channels 1, 6, and 11. By analyzing this spectrogram a WIPS server can determine that channels 1, 6, and 11 are where most of the wireless activity is and accordingly spend more time decoding packets on these channels. FIG. 5B depicts a spectrogram with a Bluetooth device operating in the vicinity of a radio. FIG. 5C depicts a spectrogram with a microwave oven operating in the vicinity of a radio. FIG. 5D depicts a spectrogram of a 2.4 GHz pulsed radar. Other wireless devices will have their own spectrogram. Spectrograms produced by the quick scan can be analyzed to identify sources of interference by the computer or server based on known spectrogram signatures. If several radios are spatially distributed and simultaneously pick up a signal on a given frequency at a given time, the central server can correlate this information and run an RF triangulation calculation to estimate the physical location of the interference source based on known locations of the sensor radios.

Figures 6A, 6B:
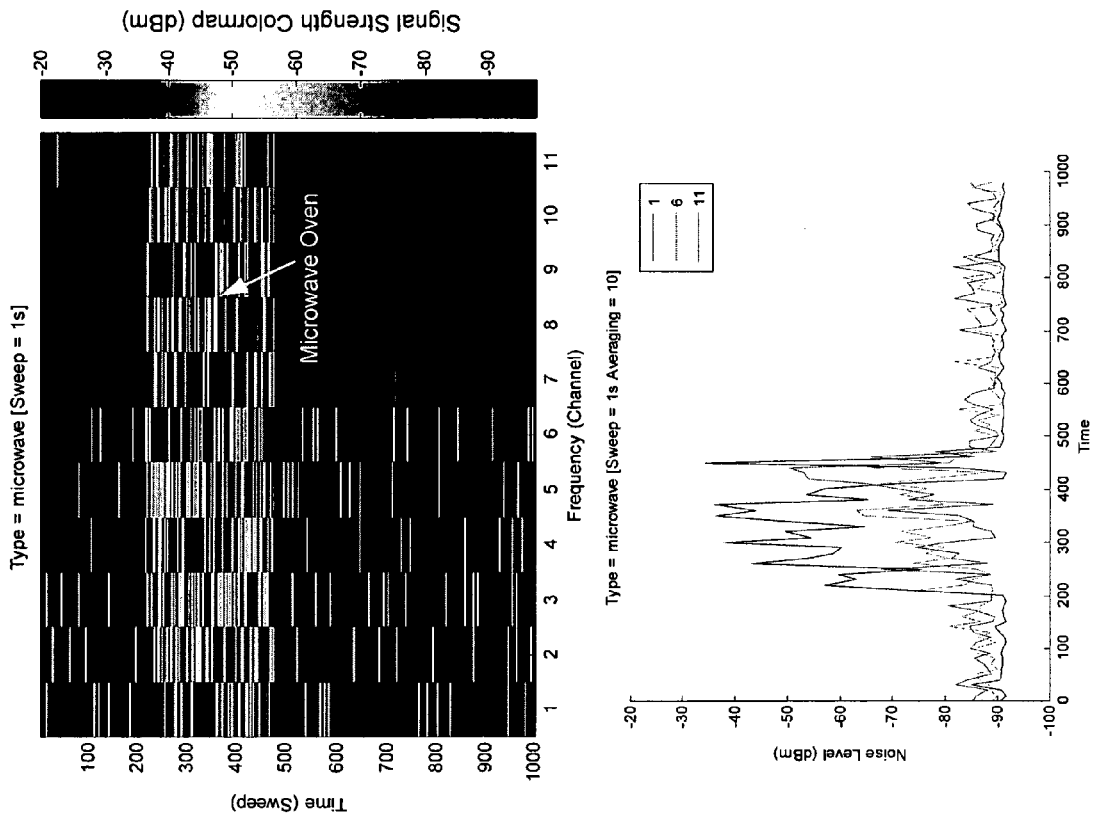
FIGS. 6A-6B are a spectrogram from a quick scan and a plot of time versus noise signal strength for three channels.

FIGS. 6A-6B depict a spectrogram from a quick scan and a plot of time versus noise signal strength for three channels. A WIPS can correlate performance degradation alarms to time periods in the spectrogram where noise levels are high. FIG. 6A depicts a spectrogram showing increased noise power across all channels in the 2.4 GHz band (i.e., channels 1 through 11) for a period of time. The spectrogram was captured using a 20 MHz bandwidth. FIG. 6B depicts a plot of time versus noise power of three of the 11 channels (i.e., channels 1, 6, and 11). In this example, the noise was from a microwave oven operating in the vicinity of the radios. The WIPS can identify the duration when the microwave was on based on the spectrogram and time versus noise plot.

What is claimed is:

1. A method for using a plurality of wireless radios in a wireless network for spectral analysis, the method comprising the steps of:

connecting to a plurality of wireless radios in wireless devices operable to perform as wireless communications devices within a wireless network operating as a WLAN;

setting a center frequency and bandwidth on the wireless radios, wherein the center frequency and bandwidth comprise a range of frequencies over which the wireless radios are operable to receive signals, and wherein the center frequency is located anywhere between 2.4-2.5 GHz and 4.9-5.9 GHz with frequency steps of less than 5 MHz;
receiving spectral power measurements from the wireless radios, the spectral power measurements being based upon signals received by the wireless radios based upon the set center frequency and bandwidth, and wherein the spectral power measurements comprising signal strength at the set center frequency and bandwidth; and
repeating the connecting, setting and receiving steps using the wireless radios such that a plurality of frequencies used by the wireless network are analyzed for spectral activity, wherein at least one of the plurality of frequencies are offset from WLAN channels such that the spectral power measurements provide measurements across a frequency band wider than a single WLAN channel.

2. The method of claim 1, wherein the wireless radios comprise any of WLAN cards, WLAN access points, or bluetooth cards, and wherein the method uses existing WLAN infrastructure as spectrum analyzers to scan for wireless spectral power measurements without requiring separate stand-alone spectrum analyzers or additional equipment from the existing WLAN infrastructure.

3. The method of claim 1, further comprising the step of determining bandwidth on one of the wireless radios, wherein the bandwidth ranges from 1 MHz to 40 MHz, and setting the center frequency and the bandwidth on the one of the wireless radios based on the determined bandwidth.

4. The method of claim 3, further comprising the step of displaying a spectrogram comprising a frequency and time plot of spectral power measured for a plurality of channels.

5. The method of claim 3, further comprising the step of storing the spectral power measurements in a computer readable medium.

6. The method of claim 3, further comprising the step of storing the spectral power measurements according to the locations of the wireless devices taking the spectral power measurements such that locations of interference can be identified.

7. The method of claim 1, wherein the plurality of wireless radios are set at a channel for a user programmable duration of time.

8. The method of claim 7, wherein the user programmable duration of time is less than a time required to decode packets.

9. The method of claim 1, wherein the wireless radios comprise different types of wireless devices used to communicate data among wireless users or between wireless users and a wired network.

10. The method of claim 1, wherein the bandwidth of the wireless devices is settable to obtain greater resolution, thereby allowing the user to differentiate wireless devices emitting signals on frequencies in close proximity to one another, and wherein the wireless devices comprise WLAN devices without separate stand-alone spectrum analyzers.

11. The method of claim 1, wherein the wireless radios are configured to capture the spectral power measurement in any of an average power over a period of time, a minimum power over a period of time, a maximum power over a period of time, or combinations thereof, wherein the wireless radios are further configured to transmit the spectral power measurement to a wireless intrusion prevention system, and wherein the wireless radios are utilized as spectrum analyzers without separate stand-alone spectrum analyzers.

12. The method of claim 1, further comprising the step of utilizing the spectral activity by a wireless intrusion prevention system to determine a wireless channel monitoring pattern, wherein the wireless channel monitoring pattern is based upon past history and current usage based on the spectral activity.

13. The method of claim 1, further comprising the steps of determining a plurality of known spectrogram signatures each corresponding to a known class of devices; and responsive to interference in the wireless network, identifying a potential class of an interfering wireless device by comparing a spectrogram formed by the spectral power measurements of the interfering wireless device to the plurality of known spectrogram signatures.

14. A method for identifying interference in a wireless network based on spectral analysis, the method comprising the steps of:
scanning with existing WLAN equipment a plurality of channels associated with the wireless network to measure the spectral power of the signals transmitting on the channels, wherein the existing WLAN equipment provides functionality of spectrum analyzers without requiring separate spectrum analyzers or equipment other than the existing WLAN equipment, and wherein the existing WLAN equipment is configured to not decode WLAN packets while scanning;
receiving the measured spectral power associated with various center frequencies from a plurality of wireless radios, wherein the various center frequencies are located anywhere between 2.4-2.5 GHz and 4.9-5.9 GHz with frequency steps of less than 5 MHz;
repeating the scanning and receiving steps until either a predetermined time has elapsed, or substantially all channels have been measured; and
constructing a spectrogram, wherein the spectrogram comprises a frequency and time plot of the measured spectral power for each channel.

15. The method of claim 14, further comprising the steps of determining a plurality of known spectrogram signatures each corresponding to a known class of devices; and responsive to interference in the wireless network, identifying potential classes of devices causing the interference by comparing the spectrogram to the plurality of known spectrogram signatures.

16. The method of claim 14, further comprising the step of physically locating an interference source with radio frequency triangulation based on power levels measured simultaneously by a plurality of radios.

17. The method of claim 16, further comprising the step of analyzing performance degradation of the wireless network by correlating performance degradation with the interference.

18. A wireless intrusion prevention system comprising a plurality of wireless radios and at least one of a server, computer, and Internet appliance is configured to scan a plurality of channels of a wireless network for spectral power measurements on a plurality of channels, wherein the wireless radios comprise wireless devices operable to communicate on the wireless network, the scan being responsive to at least one of a wireless attack, performance degradation, and an unauthorized device accessing the wireless network, wherein the wireless intrusion prevention system uses existing WLAN infrastructure as spectrum analyzers to scan for spectral power measurements without requiring separate stand-alone spectrum analyzers, wherein the wireless intrusion prevention system is configured to utilize WLAN compliant radios to scan the plurality of channels over a frequency band in excess of any one WLAN channel, and updating of channel monitoring patterns based upon past history and current usage based on the spectral power measurement.

19. A method for using spectral analysis to determine which channels to monitor for detecting attacks and unauthorized activity on a wireless network, the method comprising the steps of:

scanning with existing WLAN equipment a plurality of channels associated with a wireless network to measure the spectral power of the signals transmitting on the channels, wherein the existing WLAN equipment does not include separate stand-alone spectrum analyzers;

identifying which of the channels are in use based upon the spectral power measurements associated with the channels, wherein the channels in use comprise channels with high signal spectral power measurements; and updating channel monitoring patterns for detecting attacks and unauthorized activity on the wireless network based upon the identification of channel usage, wherein the channel monitoring patterns comprise dwell time per channel and a sequence of channel monitoring, and wherein the updating of the channel monitoring patterns is based upon past history and current usage based on the spectral power measurements.

20. The method of claim 19, wherein the scanning, identifying, and updating steps are performed by a wireless intrusion prevention system comprising a plurality of wireless radios and at least one of a server, computer, and Internet appliance.

21. The method of claim 19, wherein the channels determined to be in use are monitored for unauthorized activity.

22. The method of claim 21, wherein the plurality of wireless radios are configured to measure the spectral power on each channel over a period of time less than 10 ms.

23. The method of claim 19, wherein the scanning of substantially all channels is performed by the plurality of wireless radios, the wireless radios comprising any of a WLAN card, a WLAN access point, or a Bluetooth device, and wherein the scanning is performed at a center frequency located anywhere between 2.4-2.5 GHz and 4.9-5.9 GHz with frequency steps of less than 5 MHz.

24. The method of claim 19, wherein the WIPS stores historical channel usage, wherein historical channel usage comprises data illustrating which channels are in use during at least one previous scan performed by the WIPS.

25. The method of claim 24, wherein the channel monitoring patterns are updated responsive to historical channel usage.

* * * * *